Jan. 6, 1948. L. C. PAUL 2,434,224
EXPANSION JOINT
Filed June 10, 1944
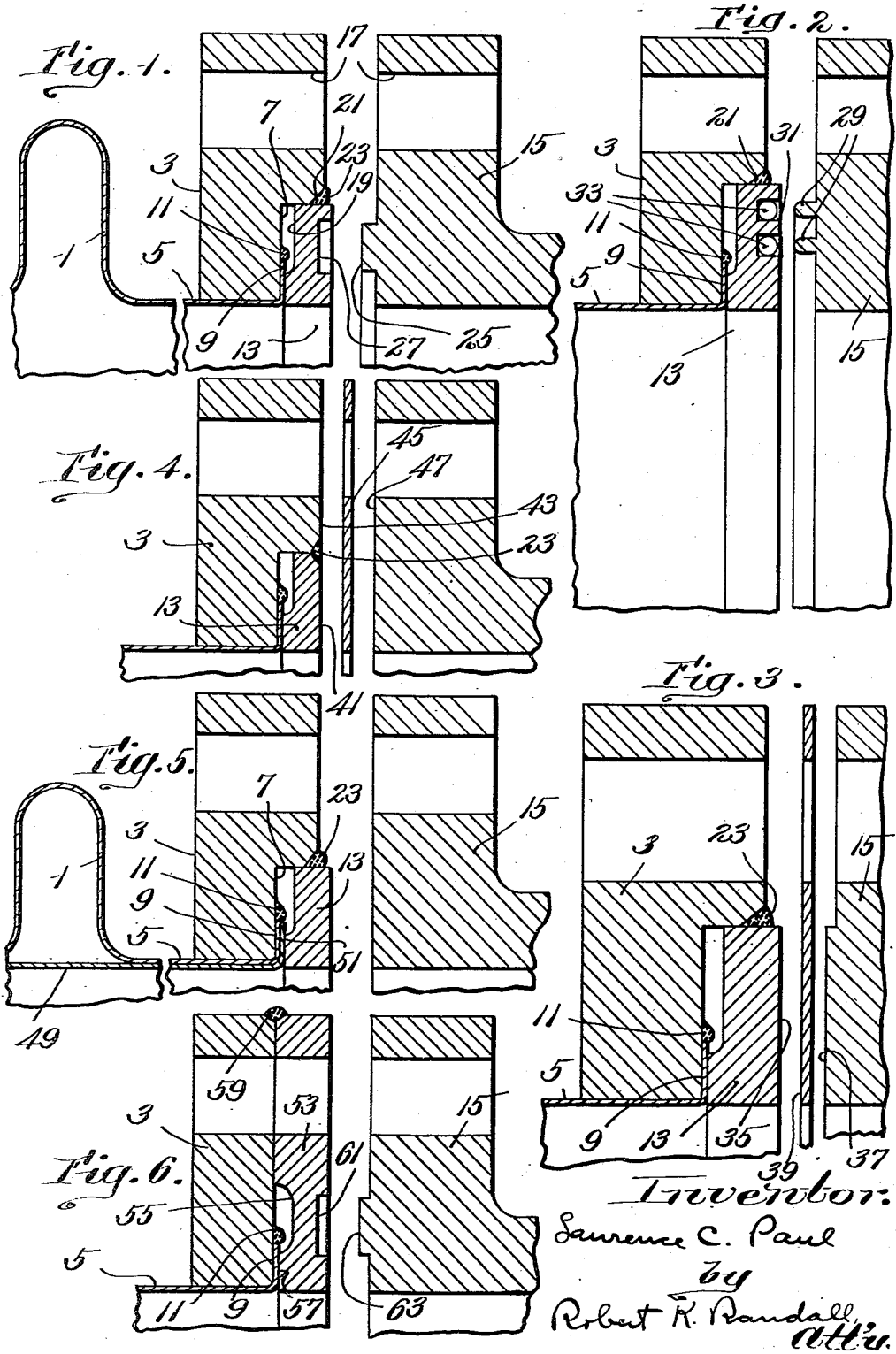

Patented Jan. 6, 1948

2,434,224

UNITED STATES PATENT OFFICE 2,434,224

EXPANSION JOINT

Lawrence C. Paul, Newton, Mass., assignor to Badger Fire Extinguisher Company, Somerville, Mass., a corporation of Massachusetts Application June 10, 1944, Serial No. 539,639

18 Claims. (Cl. 285—90)

This invention relates to pipe joints in general and in particular to expansion joints and to the method and means of securing the ends of the flexible corrugated sleeve or expansion element proper to the pipe line, port, conduit, or the like, with which it is to be combined in use.

Briefly stated, the invention consists in uniting the flexible corrugated sleeve or expansion element proper to a bolting flange, whereby it is secured in place in the pipe line or the like, by means of a ring rabbeted into or abutting against the face of such flange, the ring clamping an outturned rim at the end of the expansion element between itself and the flange, preferably with both the edge of this rim of the expansion element and the outer circumference of the ring being welded to the flange, the exposed face of the ring affording a bearing surface to go against a companion flange on the pipe line or the like, or against intervening gasket material, when the two flanges are bolted together.

The improved joint structure of the invention lends itself particularly to use in high pressure pipe lines, because the projection of the ring beyond the surface of the flange into which it is rabbeted or against which it abuts concentrates the seating pressure exerted between the flange on the expansion joint and the companion flange on the pipe line, when the two are bolted together, thus effecting a tighter seal. In addition, by the use of the clamping ring any desired type of dovetail or tongue-and-groove or other special mating faces for high pressure work can be easily provided on the clamping ring itself without need to modify the basic form of the bolting flange provided on the end of the expansion joint.

Further, when a non-corrodible pipe line is required, and a stainless steel or other non-corrodible expansion element is used, only the clamping ring needs to be made of non-corrodible metal, the rest of the bolting flange on the expansion joint being made of ordinary steel or any other desired metal with obvious economy of cost. This is in marked contrast to prior types of construction, in which the entire bolting flange at each end of the expansion joint had to be made of non-corrodible metal for this purpose, because of seepage under the innermost edges of the gasket applied between the flanges.

The invention has further important advantages in making expansion elements where the flexible corrugated sleeve is made of metal of lower ductility, such as stainless steel and certain other metals including steel, nickel, and Monel, in which an integral flange or "vanstone" of sufficient width to provide a seat against the gasket adequate for proper sealing cannot be formed because these metals in the thin gauges needed for proper flexing of the expansion element cannot be stretched far enough without splitting. In these cases, the common resort is to turn out a narrow integral flange on the expansion element and weld its outer edge within a rabbet cut in the face of the bolting flange on the end of the expansion joint, the depth of the rabbet being such that both the integral flange on the expansion member and the welding bead joining it to the bolting flange lie below the plane of the face of the bolting flange, thus enabling such face to be drawn up tightly against a gasket interposed between it and the face of the companion bolting flange on the pipe or the like to which the expansion joint is attached. Since the welding bead is unavoidably thicker than the thin metal of the outturned flange of the expansion element, while the rabbet in which they are situated is deeper still, the portion of the outturned integral flange between the welding bead and the cylindrical end portion of the expansion element that is surrounded by the bolting flange is unsupported against end-thrust resulting whenever the pipe line expands with accompanying compression of the expansible element. The result is that flexing and eventual cracking of the weld occurs which causes leakage and early failure of the expansion joint.

Through the use of the novel clamping ring in the improved construction, and by forming a groove or rabbet in such clamping ring, to bridge over and stand clear of the welding bead around the edge of the outturned end of the expansion element, so that the clamping ring has no actual contact with the welding bead, the axial pressure applied in bolting up the two opposing bolting flanges causes the clamping ring to bear tightly against the outturned smooth surface of the end of the expansion element, clamping the end against the bottom of the rabbet in the bolting flange, taking the end-thrust of the expansion element in expanding and transmitting it directly to the bolting flanges, thus taking all strain off of the weld and preventing any flexing thereof.

In addition, the clamping ring provides a wide smooth surface bearing against a gasket, without resort to increasing the diameter of the bolting flanges in order to attain it. Since it is impracticable to machine the welding bead which has an inherently rough and uneven surface against which the gasket cannot make a proper fit, it is not possible to provide a full-width gasket seat on the flange outside the welding bead, without adding to the width and cost of the bolting flanges.

Other objects of the invention, and the manner of their attainment, are as set forth hereinafter.

Illustrative embodiments of the invention are shown in the accompanying drawings, in which Fig. 1 is a view showing in vertical section a portion of one end of an expansion joint embodying the invention principle, and showing also a companion flange having a special mating face for high pressure work.

Fig. 2 is a corresponding fragmentary section showing a different form of mating face employed according to the invention.

Fig. 3 is a view similar to Fig. 2 showing the use of the invention principle in connection with a raised plane face.

Fig. 4 is a view similar to Fig. 3, using a flush plane face.

Fig. 5 is a view similar to Fig. 3, showing how a lining sleeve is combined with the expansion element by use of the invention.

Fig. 6 shows an alternative form of clamping ring.

At 1 in Fig. 1 is indicated a portion of one end of the flexible corrugated sleeve or expansion element proper of a typical expansion joint, with a bolting flange 3 applied to the cylindrical terminal portion 5 thereof. The bolting flange has a deep rabbet 7 formed in its face having its bottom disposed in a substantially radial plane. When the expansion element 1 is made of stainless steel or other metal of low ductility, an integral flange 9 is turned out on the end thereof into a radial plane, having whatever width can be safely attained without splitting, embrittling, or injuriously stressing the metal in the flaring process. The rim of flange 9 is then welded to the bottom of rabbet 7 around its entire periphery, as indicated by the welding bead 11, thus creating a leakproof connection to the flange 3.

A clamping ring 13 is provided having an outside diameter fitting closely within the rabbet 7 and an internal diameter matching that of expansion element 1, and a thickness sufficient to extend slightly beyond the plane of the face of bolting flange 3 when seated within the rabbet 7 and upon the integral flange 9 of expansion element 1. The face of clamping ring 13 that is adjacent the integral flange, is cut away, grooved, or rabbeted so as to bridge over and clear the welding bead 11 without making any contact therewith whatsoever, so that when flange 3 is drawn toward the companion flange 15 on the pipe line, port, or the like, by means of bolts put through aligned bolt holes 17, a major part of the axial pressure resulting from bolting up will be transmitted by clamping ring 13 to the outturned end 9 of the expansion element to clamp it to its seat in the bottom of rabbet 7. Preferably this cutting away of clamping ring 13 is in the form of a rabbet 19 extending a liberal distance inward from the circumference of ring 13, to accommodate various widths of flanges 9 as determined by the ductility of the metal used in forming expansion element 1, and the correspondingly varying radial location of the welding bead 11.

The outward corner of rabbet 7 in bolting flange 3 is beveled off as indicated at 21, to receive a bead of welding metal 23 which is applied in leakproof relation around the entire circuit of clamping ring 13 while the latter is held firmly pressed against the outturned flange 9, by any suitable means. In this manner the clamping ring 13 is made a permanent part of the expansion joint unit, and any fluid which might be driven into the rabbet 19 under pressure is prevented from leaking outwardly between clamping ring 13 and bolting flange 3. The bevel at 21 provides a recess enabling the entire welding bead 23 to be kept below the level of the outward face of clamping ring 13.

As is obvious in the drawings, the clamping ring 13 extends radially inward into line with the inward surface of the wall of cylindrical end part 5 of the expansion element, that is, to the bore diameter of part 5, so that it receives the direct end-thrust of this portion when the expansion joint is compressed, thus preventing any axial movement of any portions of the outturned end and any flexing either of the weld 11 or of the angle between outturned flange 9 and portion 5.

As shown in the drawings, it is a simple matter to provide any desired type of special mating faces between the bolting flanges on the expansion joint and on the pipe or the like. In the case of a rectangular tongue-and-groove joint, as shown in Fig. 1, an integral annular raised rib 25 of rectangular section formed on pipe flange 15 is received in a correspondingly shaped annular groove 27 in the outward face of clamping ring 13. Fig. 2 shows a double tongue-and-groove shape, in which concentric tongues 29 on the pipe flange 15 are received in correspondingly shaped annular grooves 31 in the clamping ring 13, in which grooves are located cast iron gaskets 33, for use where extreme high pressures are met with. These examples illustrate how any desired or preferred special mating faces to meet special requirements are provided in accordance with the invention. As shown in Fig. 3, when the expansion joint is connected into a low pressure line, the outward face of the clamping ring is made flat in a radial plane as indicated at 35, with the opposing face portion 37 of the companion flange 15 similarly flat and radial, and with a flat gasket 39 interposed between the two surfaces. In this instance both the face 35 of the clamping ring and the opposing face 37 of the companion flange are raised above the surfaces of the rest of the flange faces, to concentrate the pressure. In other cases, as shown in Fig. 4, the clamping ring 13 has its outward face 41 made flush with the face 43 of its bolting flange 3, by cutting down these two parts and the welding bead 23 all into the same plane after they have been assembled on the terminal portion 5 of the expansion element. Gasket 45, interposed between bolting flange 3 and the companion flange 15, which likewise has a plane face 47, thus bears against both flanges and the clamping ring throughout their entire face area.

Fig. 5 shows how the invention is employed where it is desired to provide a cylindrical lining sleeve within the corrugated expansion element to provide a smooth flow surface therein. In this case, the cylindrical lining sleeve 49 is provided with an integral flange or "vanstone" 51 formed in a radial plane and slightly less in outside diameter than the diameter of flange 9 on the expansion element, so that it will not overlap onto the welding bead 11. This flange 51 is then interposed between flange 9 on the expansion element and the clamping ring 13, the latter then pressed tightly into its rabbet and against flange 51, and the welding bead 23 then put in place to hold the parts in this relation. When the joint is bolted to its companion flange 15, both parts 9 and 51 are gripped tightly and fully supported against end thrust, by the clamping ring 13.

Fig. 6 shows a modification in which the clamping ring is abutted against the face of the bolting flange 3 of the expansion joint, instead of being rabbeted into such face. In this case, the clamping ring 53 has the same outside diameter as the bolting flange and its companion flange 15, extending inward to the flow line of the cylindrical portion 5 of the corrugated expansion element. The integral flange 9 on the end of portion 5 is welded directly to the face of bolting flange 3 at 11, and the clamping ring 53 has an annular groove 55 in its proximate face deep enough to bridge over and clear such welding bead at all points, the groove being wide enough to allow for various locations of the bead 11. The radial surface 57 extending from the bore diameter to the annular groove 55, and comprising the portion of clamping ring 53 which takes bearing against the outturned flange 9 of the corrugated sleeve 5, is cut down by an amount equalling the thickness of flange 9, to accommodate such flange while permitting seating of the proximate face of ring 53 against its bolting flange throughout the areas lying radially beyond groove 55. Ring 53 is welded to bolting flange 3 as indicated at 59 by a bead of welding running entirely around the circumference of the ring and the flange 3, and received within appropriate bevels formed in these parts therefor. As indicated, a tongue-and-groove joint 61, 63, or any other desired form of plane or mating faces, may be provided on the ring and on the companion flange 15.

It is to be noted that the invention structure in all its forms makes it possible to locate the sealing contact between the two opposing bolting flanges at practically any desired distance from the common axis of the pipe line and of the expansion joint that may be desired, irrespective of the location of the welding bead 11 in its spaced relation to such axis. In other words, the sealing contact is no longer confined to areas of the bolting flanges lying outside the radius of the outturned portions 9 of the expansion elements and their welding beads 11, which improved construction not only obviates all need to sacrifice a proper gasket seating surface, but also gets the sealing contact as close as possible to the line of the bore of the pipe and the expansion element, eliminating eddy pockets and concentrating the sealing pressure per unit of contact area of the sealing surfaces.

While I have illustrated and described certain forms in which the invention may be embodied, I am aware that many modifications may be made therein by any person skilled in the art, without departing from the scope of the invention as expressed in the claims. Therefore, I do not wish to be limited to the particular forms shown, or to the details of construction thereof, but What I do claim is:

1. An expansion joint having in combination a bolting flange for attachment to a companion flange, a flexible corrugated sleeve, and a ring rabbeted into the bolting flange beyond the end of the sleeve and clamping an outturned end of the sleeve between itself and the latter flange, the ring being engaged by and receiving pressure from the companion flange within the width of such outturned end.

2. An expansion joint having in combination a bolting flange for attachment to a companion flange, a flexible corrugated sleeve, and a ring rabbeted into the bolting flange beyond the end of the sleeve and clamping an outturned end of the sleeve between itself and the latter flange, the end of the sleeve being welded to the flange, and the ring being pressed against the sleeve by the companion flange within the width of such outturned end.

3. An expansion joint having in combination a bolting flange for attachment to a companion flange, a flexible corrugated sleeve, and a ring rabbeted into the bolting flange beyond the end of the sleeve and clamping an outturned end of the sleeve between itself and the latter flange, the ring being welded to the flange, and the ring being pressed against the sleeve by the companion flange within the width of such outturned end.

4. An expansion joint having in combination a bolting flange, a flexible corrugated sleeve, and a ring rabbeted into the flange beyond the end of the sleeve and clamping an outturned end of the sleeve between itself and the flange, the ring and the end of the sleeve being welded to the flange in separate planes.

5. An expansion joint having in combination a bolting flange, a flexible corrugated sleeve, and a ring rabbeted into the flange beyond the end of the sleeve and clamping an outturned end of the sleeve between itself and the flange, the end of the sleeve being welded to the flange intermediate the width of the ring.

6. An expansion joint having in combination a bolting flange, a flexible corrugated sleeve, and a ring rabbeted into the flange beyond the end of the sleeve and clamping an outturned end of the sleeve between itself and the flange, the ring being welded to the flange along the ring's circumference and beyond the rim of the outturned end of the sleeve.

7. An expansion joint having in combination a bolting flange, a flexible corrugated sleeve, and a ring rabbeted into the flange beyond the end of the sleeve and clamping an outturned end of the sleeve between itself and the flange, the end of the sleeve being welded to the flange intermediate the width of the ring and the ring being in contact with the outturned end of the sleeve but out of contact with the weld.

8. An expansion joint for attachment to the flange of a pipe, port, conduit, or the like, having in combination a bolting flange, a flexible corrugated sleeve, and a ring rabbeted into the bolting flange receiving axial pressure from the pipe flange and clamping an outturned end of the sleeve between itself and the said bolting flange.

9. An expansion joint for attachment to the flange of a pipe, port, conduit, or the like, having in combination a bolting flange, a flexible corrugated sleeve, and a ring rabbeted into the bolting flange and protruding beyond the face of the bolting flange receiving axial pressure from the pipe flange and clamping an outturned end of the sleeve between itself and the said bolting flange.

10. An expansion joint for attachment to the flange of a pipe, port, conduit, or the like, having in combination a bolting flange, a flexible corrugated sleeve, and a ring rabbeted into the bolting flange receiving axial pressure from the pipe flange and clamping an outturned end of the sleeve between itself and the said bolting flange, the rim of the outturned end of the sleeve being welded to the bolting flange and the ring being recessed to bridge over and clear the line of welding.

11. An expansion joint for attachment to the flange of a pipe, port, or other conduit, having in combination a flexible corrugated sleeve, a bolting flange having a rabbet, a bead of welding metal joining the rim of an outturned end of the sleeve to the bolting flange within the rabbet, and a ring within the rabbet bearing against the outturned end of the sleeve and overlying the welding bead, extending axially beyond the bolting flange in a direction away from the sleeve, and welded to the bolting flange.

12. An expansion joint for attachment to the flange of a pipe, port, or other conduit, having in combination a flexible corrugated sleeve, a bolting flange having a rabbet, a bead of welding metal joining the rim of an outturned end of the sleeve to the bolting flange within the rabbet, and means engaging the outturned end inwardly of the welding bead making sealing contact between the pipe flange and the end of the sleeve.

13. An expansion joint for attachment to the flange of a pipe, port, or other conduit, having in combination a flexible corrugated sleeve, a bolting flange having a rabbet, a bead of welding metal joining the rim of an outturned end of the sleeve to the bolting flange within the rabbet, and means in fixed connection with the bolting flange overhanging the welding bead and the outturned end of the sleeve making sealing contact with the pipe flange.

14. An expansion joint for attachment to the flange of a pipe, port, or other conduit, having in combination a flexible corrugated sleeve, a bolting flange, a bead of welding metal joining the rim of an outturned end of the sleeve to the bolting flange, and means contacting the outturned end of the sleeve without engaging the welding bead, and pressed against such end by the axial pressure of the pipe flange when the two flanges are bolted together.

15. An expansion joint for attachment to the flange of a pipe, port, or other conduit, having in combination a flexible corrugated sleeve, a bolting flange, a bead of welding metal joining the rim of an outturned end of the sleeve to the bolting flange, and means pressing the portions of such outturned end lying radially inward from the welding bead against the bolting flange when the two flanges are bolted together.

16. An expansion joint for attachment to the flange of a pipe, port, or other conduit, having in combination a flexible corrugated sleeve, a bolting flange, a bead of welding metal joining the rim of an outturned end of the sleeve to the bolting flange, and means preventing axial movement of the portions of the outturned end lying radially inward from the welding bead when the two flanges are bolted together.

17. An expansion joint for attachment to the flange of a pipe, port, or other conduit, having in combination a flexible corrugated sleeve, a bolting flange, a bead of welding metal joining the rim of an outturned end of the sleeve to the bolting flange, and means filling the space between the outturned end and the pipe flange, from the welding bead to the bore diameter of the sleeve at its junction with the outturned area.

18. In an expansion joint for connection to a pipe flange, the latter having a special face comprising annular ribs or grooves, in combination, a flexible corrugated sleeve having an outturned end, a bolting flange on the expansion joint, a welding bead joining the outturned end to the said bolting flange, and a ring having annular grooves or ribs complementary to these parts on the pipe flange and attached by a welded joint to the said bolting flange.

LAWRENCE C. PAUL.

REFERENCES CITED

The following references are of record in the file of this patent:

UNITED STATES PATENTS

| Number | Name | Date |
| --- | --- | --- |
| 337,037 | White | Mar. 2, 1886 |
| 468,129 | Cumberbatch | Feb. 2, 1892 |
| 930,692 | Robinson | Aug. 10, 1909 |
| 1,744,467 | Greene | Jan. 21, 1930 |
| 1,809,927 | Emanueli | June 16, 1931 |
| 2,170,574 | Sauzedde | Aug. 22, 1939 |

FOREIGN PATENTS

| Number | Country | Date |
| --- | --- | --- |
| 386,014 | Great Britain | Jan. 12, 1933 |